Patented Sept. 9, 1952

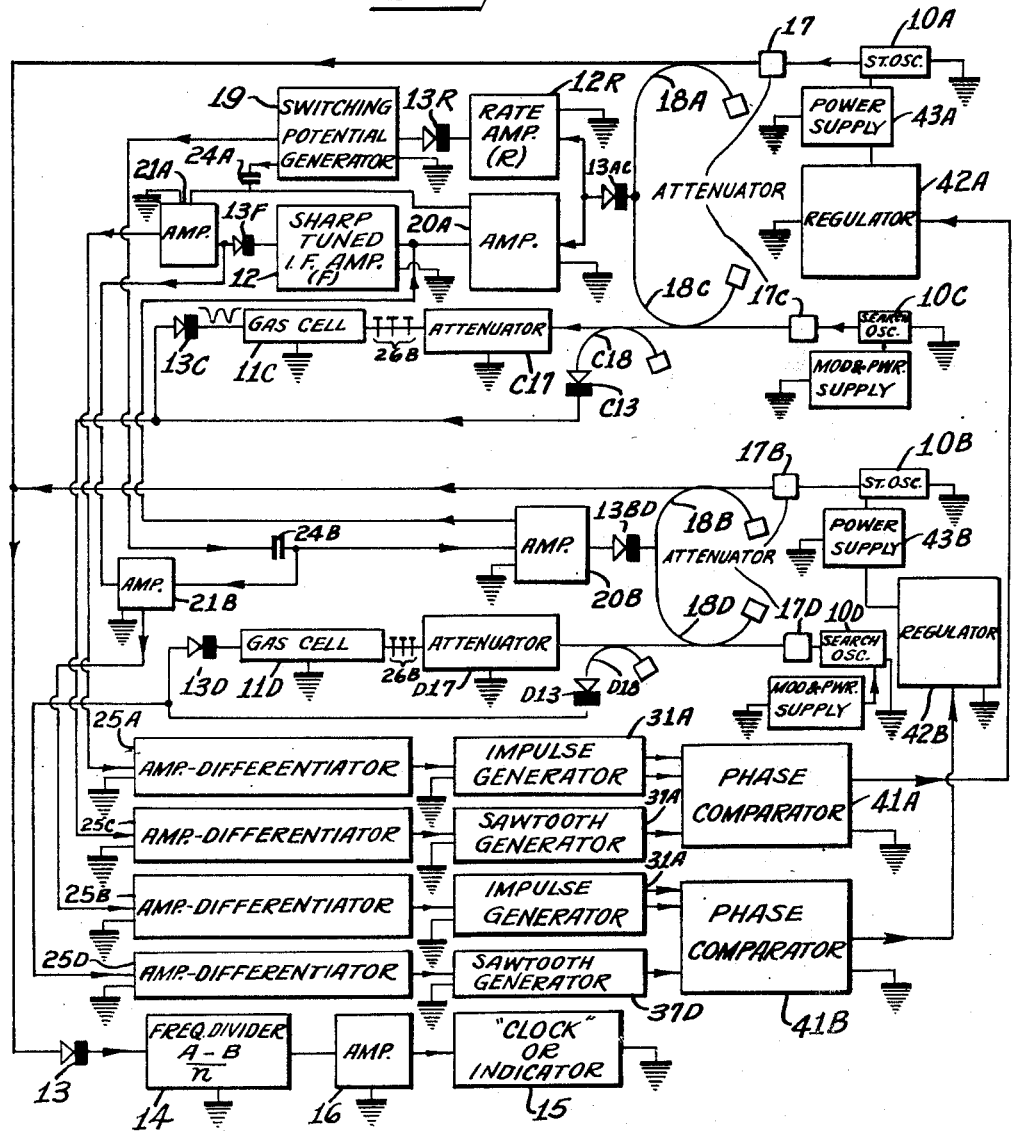

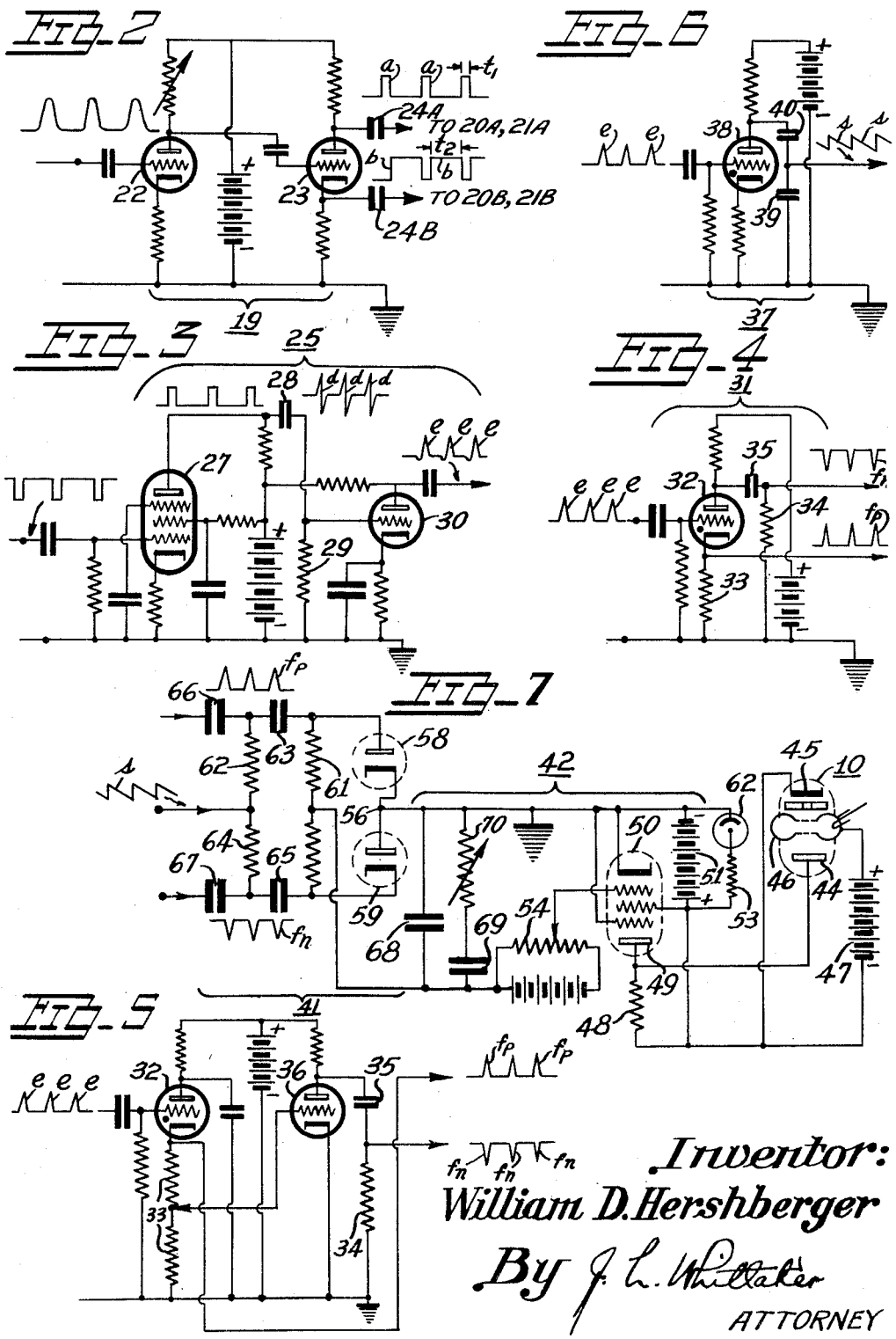

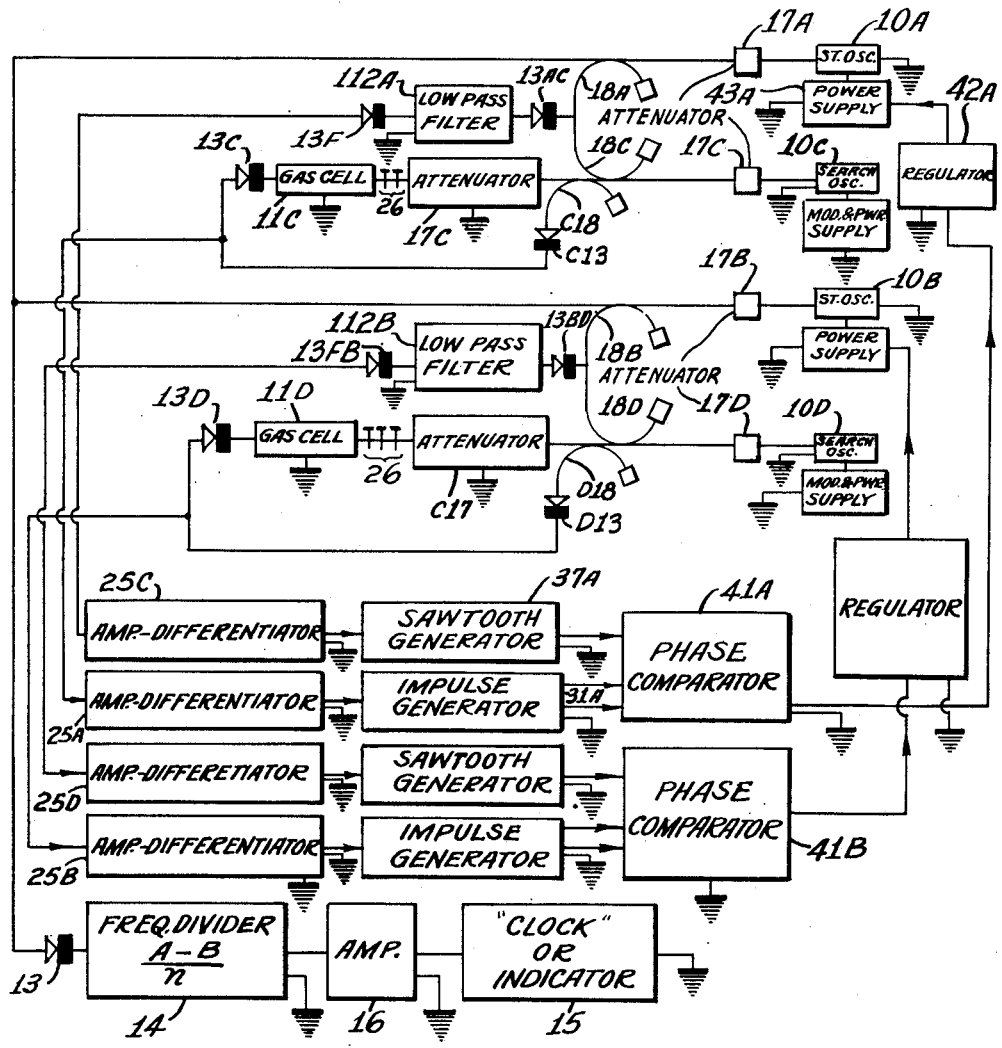

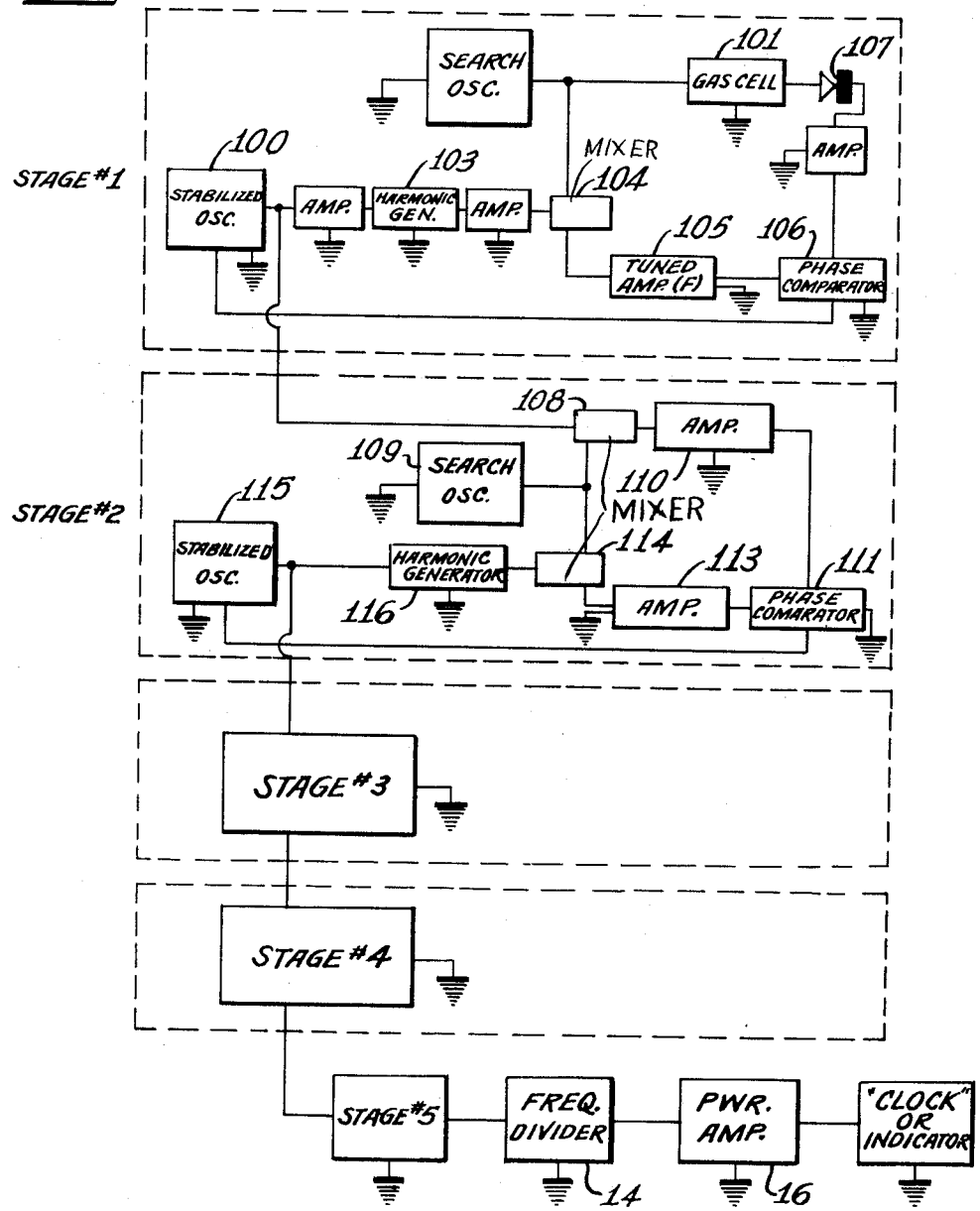

2,609,654

UNITED STATES PATENT OFFICE 2,609,654

METHOD OF AND SYSTEM FOR OBTAINING A STANDARD LOW FREQUENCY

William D. Hershberger, Princeton, N. J., assignor to Radio Corporation of America, a corporation of Delaware Application February 7, 1948, Serial No. 6,975

11 Claims. (Cl. 58—24)

1

This invention relates to methods and systems for utilizing the molecular resonance which is exhibited by certain gases at microwave frequencies to produce a standard low frequency of high precision unaffected by conditions, such as pressure, temperature or time which impair the accuracy of previously known low-frequency standards.

At low pressures the microwave absorption spectra of certain gases, including ammonia, carbonyl sulphide and methyl halides, comprise "lines" of different and distinctive frequency distribution for the different gases, each corresponding with a precise microwave frequency not affected by changes in such ordinarily encountered variables such as temperature, pressure and the like.

Generally in accordance with the present invention, there are produced oscillations of ultrahigh frequency having a precisely fixed numerical relation to at least one of aforesaid sharply defined gas absorption lines and the oscillations of such frequency are impressed upon a frequency-divider, such as a multivibrator, to produce a standard low-frequency of, for example, the order of cycles per second suited to energize an electric clock or other indicator of time or frequency.

More particularly and in accordance with a preferred form of the invention, the conversion from a precise frequency of the order of tens of thousands of megacycles to a precise frequency of much lower order, for example, of the order of tens of megacycles, is effected by stabilizing the frequency of a series of oscillators with respect to a selected harmonic frequency of each oscillator and the fundamental frequency of the preceding oscillator.

Further in accordance with the invention, and more specifically, the frequency of the first oscillator of aforesaid series is preferably stabilized by maintaining a predetermined phase relationship between two timing waves, one of which is produced by impressing upon a gas cell the output of a search oscillator whose periodically varying frequency sweeps a range including a molecular resonance frequency of the gas and the other of which is produced by impressing the beat-frequency of the search oscillator and a selected harmonic of the stabilized oscillator upon a frequency-selector, such as a filter or resonant circuit element, discriminating in favor of a chosen beat-frequency.

The invention further resides in methods and systems having features herein described and claimed.

2

For a more detailed understanding of the invention and for illustration of systems embodying and utilizing it, reference is made to the accompanying drawings in which;

Fig. 1 is a block diagram of a system utilizing stabilized microwaves oscillators to produce a standard low-frequency;

Figs. 2 to 7 inclusive are schematic circuit diagrams of circuits represented by blocks in Fig. 1.

Fig. 8 is a block diagram of a modification of the system of Fig. 1; and

Fig. 9 is a block diagram of another modification of the system of Fig. 1.

It is known that there are a number of gases, including $NH_3$, $COS$, $CH_3OH$, $CH_3NH_2$ and $SO_2$, which exhibit selective absorption of microwave energy. From measurements of the molecular resonance characteristics of such a gas, it is known the magnitude of the absorption coefficient may be quite independent of the gas pressure but that the width of the absorption region decreases substantially with decrease of pressure; specifically at a wavelength of 1.25 centimeters (24,000 megacycles) the Q of the 3,3 line of ammonia is approximately 10 at a gas pressure of $\frac{1}{10}$ of an atmosphere; is 100 at $\frac{1}{100}$ of an atmosphere, etc. However, as the pressure is further and further reduced to the order of tenths of a millimeter of mercury and less, the absorption of regions may break up into a plurality of sharply defined lines, each precisely corresponding with a particular microwave frequency unaffected by usually encountered ambient conditions, such as temperature, pressure and other variables, and having a Q of the order of 50,000 or higher.

The selective absorption exhibited by one or more of such lines is utilized to stabilize the frequency of two or more oscillators producing oscillations whose frequencies bear to one another a fixed numerical relation and from which is derived, as by a multivibrator or like electronic frequency-divider, a precise low frequency suited as a standard of frequency or time.

Now referring to Figure 1, the microwave oscillator 10A is stabilized at a frequency A which is equal to a selected molecular resonance frequency of gas within cell 11C plus (or minus) the intermediate frequency F to which an amplifier 12 is sharply tuned. A second microwave oscillator 10B is stabilized at a frequency B which is equal to the molecular resonance of gas within cell 11D plus (or minus) the same intermediate frequency (F). The outputs of the two stabilized microwave oscillators 10A, 10B are impressed upon the mixer 13, which may be and preferably is a crystal rectifier.

The two microwave frequencies A and B may be so chosen that their difference frequency $$\left(\frac{A-B}{2}\right)$$

appearing in the output of mixer 13, is low enough to be divided by a conventional frequency divider circuit, generically represented by block 14 to produce an output frequency of the order of cycles per second. By way of example, assuming the gas used in the cells 11C and 11D is ammonia, the 8,6 line and the 9,7 line corresponding respectively with 20,719.19 megacycles and 20,735.47 megacycles may be selected to afford a difference frequency of 16.28 megacycles; the 5,4 line (22,653 megacycles) and the 4,3 line (22,683.73 megacycles) may be selected to afford a difference frequency of 30.73 megacycles; or the 2,2 line (23,722.59 megacycles) and the 1,1 line (23,694.48 megacycles) may be selected to afford a difference frequency of 24.11 megacycles, and so on for other selected pairs of lines.

Each of the gas cells 11C, 11D may be a section of wave-guide having at each of its opposite ends a window of mica or other suitable dielectric permitting passage of microwave energy and forming a gas-tight enclosure suitable for containing gas at pressures of 0.02 millimeters, or less, of mercury.

The output of frequency divider 14 may itself be used as a precision low-frequency standard or, when it is desired to operate a precision clock or indicator 15, the output of divider 14 may be amplified by a conventional low-frequency power amplifier 16 to drive the motor of clock 15 which by choice of the gas lines, of the dividing factor $n$ and of the gearing in the indicator may have, for example, a one revolution per second rotation. Preferably, the division ratio $n$ is very large so that the output of the divider 14 is very close to one cycle per second and any further ratio change is effected by selection of the gearing. It is thus insured that any remnant control error in the instantaneous difference between the frequencies A and B of the stabilized oscillators 10A and 10B is divided by a factor $n$ which is of the order of millions and so affords a time indication of high precision unattainable with any previously known means.

Preferably the method of stabilizing the individual microwave oscillators 10A and 10B is generally similar to that disclosed in my co-pending application Serial No. 4,497, filed January 27, 1948. However, it is provided, and as hereinafter more fully explained, that a frequency-selective element 12 is switched from one control system to the other, during intervals of zero input, so that any errors due to its instability with time, temperature or other variables in effect cancel out in the difference frequency between the two stabilized oscillators 10A, 10B.

In more detailed explanation of the system shown in Fig. 1, the output of stabilized oscillator 10A, suitably reduced if desired by attenuator 17, is impressed through the directional coupler 18A upon the mixer 13AC, preferably a crystal rectifier. (This and other directional couplers of systems herein disclosed may be of the type more fully described in my copending application, Serial No. 786,736, filed November 18, 1947 and entitled Method of and Means for Stabilizing the Frequency of Microwave Oscillations.) The output of a frequency-modulated search oscillator 10C is also impressed upon mixer 13AC through a directional coupler 18C preceded if desirable by an attenuator 17C. The output of the search oscillator 10C is periodically swept over a band of frequencies which may, for example, be 5 or 10 megacycles wide and which includes both the frequency A, the molecular resonance frequency of gas in cell 11C, and the frequency A plus (or minus) the intermediate frequency F. The sweep frequency or repetition rate R of the search oscillator 10C is low compared to the carrier frequencies of the oscillators 10A and 10C and is substantially different from the intermediate frequency F: the search frequency may, for example, lie in the range from 10 cycles to 10 kilocycles as produced by any suitable electronic or mechanical modulator and the modulating waveform is preferably sawtoothed. For clarity of explanation, it will be assumed that the carrier frequency C of oscillator 10C is periodically raised from an initial frequency below the molecular resonant frequency of the gas in cell 11C to a frequency higher than frequency A plus F and then abruptly returned to the initial frequency which is higher than frequency A minus F.

The output of mixer 13AC therefore includes, as one of its components, the sweep frequency R which is selected by amplifier 12R and impressed upon rectifier 13R to provide a series of control pulses for a switching potential generator 19 which controls the pairs of amplifiers 20A, 21A and 20B, 21B so that the pairs are alternately operative. The first pair of amplifiers 20A, 21A is utilized in stabilization of the frequency of microwave oscillator 10A and the second pair of amplifiers 20B, 21B is utilized in stabilization of the frequency of microwave oscillator 10B.

A suitable form of switching potential generator 19, schematically shown in Fig. 2, is more fully described in U. S. Patent 2,422,122, issued to L. E. Norton. In brief, the sweep-frequency impulses selected by amplifier 12R, Fig. 1, are applied to the input circuit of amplifier tube 22 whose output signal is impressed on the grid circuit of the inverter tube 23 to produce two series of positive substantially rectangular pulse signals "$a$" and "$b$" of complementary length. The pulses "$a$" are applied through condenser 24A, Figs. 1 and 2, to amplifiers 20A, 20B effectively to unblock them or turn them "on" for intervals of duration $t_1$ during which the amplifiers 20B and 21B are "off": the pulses "$b$" are similarly applied through condenser 24B, Figs. 1 and 2, to amplifiers 20B and 21B effectively to turn them "on" for intervals of duration $t_2$ during which the amplifiers 20A and 21A are "off."

During each time interval $t$ for which it is "on," the amplifier 21A transmits from rectifier 13F to an amplifier-differentiator represented by block 25A in Fig. 1, a wave or pulse having maximum amplitude at the instant the difference frequency between oscillator 10A and the FM oscillator 10C corresponds with frequency F to which amplifier 12 is sharply tuned. The output of amplifier 21A is a potential proportional to the envelope of amplifier 12 at repetition frequency R: otherwise expressed the output of amplifier 12 during intervals $t_1$ is a waveform whose instantaneous amplitude is a function of the beat-frequency between oscillators 10A and 10C. The shape of the output pulses of the differentiator is later discussed.

There is thus provided a series of pulses whose time relation with respect to a second series of pulses, produced as now described, is utilized to stabilize the frequency of microwave generator 10A.

Upon a second amplifier-differentiator represented by block 25C in Fig. 2, is impressed a series of pulses or waves each occurring as the carrier frequency of the FM oscillator 10C passes through the molecular resonant frequency of gas in cell 11C. More specifically, output energy from oscillator 10C is transmitted as by a wave guide to gas cell 11 through a path which may include an attenuator C17, and a matching transformer 26, both of types suitable for operation at microwave frequencies. The microwave energy selectively passed by the gas cell is rectified by crystal 13 producing pulses or waves having the same repetition rate as the modulation-frequency R of oscillator 10C. For cancellation of amplitude-modulation effects and of other variables, output energy from oscillator 10C is transmitted by directional coupler C18 to a second crystal rectifier C13, or equivalent, reversely poled with respect to rectifier 13. The differential-output of the rectifiers 13C and C13 is impressed upon the differentiator-amplifier 25C.

A suitable type of differentiation-amplifier circuit 25 for each of the differentiator-amplifiers 25A and 25C (also 25B, 25D later discussed) is shown in Fig. 3. The pulses impressed upon the input circuit of tube 27 are amplified, reversed in polarity and impressed upon the differentiator network comprising condenser 28 and resistor 29 to apply to the grid of tube 30 a double-pulse $d$ for each input pulse. Each pulse $d$ has a negative and a positive peak and is very steep between these peaks. The resulting output of tube 30 is a series of sharp pulses $e$ having a steep rise at the center of the corresponding original input pulse to tube 27.

The time constant of the resistor-capacitor combination 28, 29 is small compared to the repetition period R so that the input pulse to tube 27 is differentiated as applied to the input circuit of tube 30. The grid-cathode bias of tube 30 is such that with an anode resistance of high value the anode is only slightly above cathode potential. Consequently, the first negative swing of the grid-cathode potential of tube 30 produces little change in anode potential whereas the one immediately following causes a steep positive swing in anode potential. This steep positive rise may be used to trigger a gas triode in a subsequent stage so that the output pulses of the triode occur at the center or peak of the intermediate frequency envelope.

The output pulses $e_A$, Fig. 1, of amplifier-differentiator 25A are applied to a push-pull-impulse generator 31A to produce two trains of pulses of the same repetition frequency as pulses $e_a$ so that for each input pulse $e_A$, there is produced a pair of sharp output pulses, $f_{AN}$, $f_{AP}$, concurrent in time and of opposite polarity. Two suitable types of push-pull-impulse generator are shown in Figs. 4 and 5. In the type shown in Fig. 4, using a gas triode 32 to whose grid the input pulses $e$ are applied, the positive output pulses $f_P$ appear across the cathode resistor 33 and the negative output pulses $f_N$ appear across resistor 34 connected to the anode of the tube by condenser 35 and to the cathode of the tube by resistor 33. Alternatively, the impulse-generator may be of the two-tube type shown in Fig. 5 in which the total output voltage of tube 32 appears across the cathode resistor 33 to afford positive output pulses $f_P$ which are twice the amplitude obtainable with the circuit of Fig. 4, other conditions being the same. The cathode resistor 33 of Fig. 5 is tapped and part of the pulse output voltage applied to the grid of a second tube 36 to produce the negative pulse $f_N$ across resistor 34 in series with condenser 35 in the output circuit thereof. The circuit constants are so chosen that these pulses are equal in amplitude to the negative pulses $f_N$ and occur concurrently therewith so that as in Fig. 4, each input pulse produces a pair of sharp output pulses of opposite polarity and coincident in time.

The output pulses $e_C$, Fig. 1, of amplifier-differentiator 25C are applied to a sawtooth wave generator 37A so that for each input pulse $e_C$ thereof there is a sawtooth output pulse $s_A$ having an abrupt rise and a linear decay. A suitable type of sawtooth generator is shown in Fig. 6. The sharp input pulses $e$ are applied to the grid of tube 38 to produce across capacitor 39, which is in series with capacitor 40 between the anode and grid of the tube a series of sawtooth pulse $s$ of the repetition rate R.

Reverting to Fig. 1, the sharp pulses $f_{AN}$ and $f_{AP}$ from the double impulse generator 31A and the sawtooth pulses $s_A$ from the sawtooth generator 37A are applied to a phase-detector 41A for producing changes in a D. C. "error" voltage whose sense and magnitude depend upon the sense and extent of deviation of the frequency A of oscillator 10A from its desired value. From the foregoing, it shall be understood that the time of initiation of each sawtooth pulse $s_A$ is rigidly related to the instant that the carrier frequency of FM oscillator 10C in each cycle of its modulating frequency R passes through the precise frequency of molecular resonance of gas cell 11C. It shall further be understood that time relation between initiation of each pulse $s_A$ and the corresponding pair of pulses $f_{AN}$, $f_{AP}$ depends upon the instantaneous frequency A of stabilized oscillator 10A because if its frequency A is above normal the difference frequency F, to which amplifier 12 is sharply selective, is attained earlier in the cycle of the modulating frequency R whereas if the frequency A is below normal, the difference frequency F is attained later in the cycle. The "error" voltage produced by the phase-discriminator 41A is used to control a regulator 42A for a source 43 of supply voltage for oscillator tube 10A and so correct for deviation of its frequency A from the desired value.

The phase-discriminator or comparator 41 and regulator 42 of Fig. 7 are of type suitable for stabilizing the frequency of a reflex klystron 10, generically exemplary of each of oscillators 10A and 10B, Fig. 1, by regulation of the D. C. voltage of the reflector anode 44. A fixed D. C. voltage difference between the cathode 45 and cavity 46 of the klystron 10 is maintained by a stable or stabilized supply generically represented by battery 47. The voltage-difference between the reflector 44 and cathode 45 of the klystron depends upon the IR drop across resistor 48 connected between the anode 49 of the regulator tube 50 and the positive terminal of a source of stabilized D. C. voltage generically represented by battery 51, the gas discharge tube 52 and current-limiting resistor 53 therefor. The magnitude of the current through resistor 48 and therefore the reflector voltage depends upon the biasing voltage applied to the grid of regulator tube 50: one component of this biasing voltage is of fixed value selected, for example, by adjustment of the potentiometer 54 supplied from battery 55 or other stable source. The other component of this biasing voltage is the "error" output voltage of the phase-detector 41 as appearing between terminals 56, 57 thereof.

In the particular form of phase-comparator 41 shown in Fig. 7, the positive and negative pulses $f_P$ and $f_N$ from the preceding associated differentiator-amplifier are respectively applied to the anode of diode 58, or equivalent, and the cathode of a similar rectifier 59. The electrodes of the rectifiers are connected by resistors 61, 61 whose common terminal 57 is one of the output terminals of the comparator; the other electrodes of these rectifiers are connected to the other output terminal 56 of the comparator. The pulses $s$ from the preceding associated sawtooth generator are applied to the anode of rectifier 59 through resistor 62 and condenser 63 and to the cathode of rectifier 59 through resistor 64 and condenser 65. Thus, the average difference value of the current pulses which traverse the resistors 61, 62 in each cycle of the repetition frequency R depends upon the phase relation of the sharp pulses $f_P$, $f_N$ to the sawtooth pulse $s$ and thus the grid-voltage of regulator tube 59 is corrected, if necessary, in each cycle of the modulating frequency of the search oscillator to adjust the controlled or stabilized oscillator 10 in sense to return its frequency to the desired value.

By way of example, the following circuit constants are given as suitable for the phase-discriminator circuit 41:

Capacitors:

| | mfd. |
|---|---|
| 63, 65 | .05 |
| 66, 67 | .01 |
| 68 | .01–.25 |
| 69 | 10 |

Resistors:

| | |
|---|---|
| 61 | megohms__ 1.8 |
| 62, 64 | ohms__ 1,000 |
| 70 | ohms max.__ 10,000 |

As thus far specifically described, the system provides for rigid control of the frequency of oscillator 10A by an error voltage derived by comparison of the phase relation of pulses produced during the time intervals $t_1$ for which the amplifiers 20A and 21A are "on." During the intervening time intervals $t_2$ for which the amplifiers 21A and 21B are "on," a generally similar arrangement, including the FM search oscillator 10D, gas cell 11D, intermediate frequency amplifier 12, rectifier 13F, differentiator amplifiers 25B, 25D, impulse generator 31B, sawtooth generator 37D, phase comparator 41B, regulator 42B and variable power supply 43B is effective to stabilize the oscillator 10D for operation at a frequency B differing from the frequency of molecular resonance in gas cell 11D by the intermediate frequency F.

It is to be noted that the same intermediate frequency amplifier channel 12, 13F is alternately used in control of oscillator 10A during intervals $t_1$, and in control of oscillator 10B during intervals $t_2$. Consequently, any effects of temperature or supply voltage, for example, upon the response characteristics of the intermediate frequency system cancel out so that in effect the difference frequency of the stabilized oscillators is precisely related to the selected sharp molecular resonance frequencies, which are not affected by temperature, of the bodies of gas in cells 11C and 11D. The exact frequency of the input to amplifier 12 at which switching occurs is not critical so long as the switching pulse at crystal 13R occurs in the cycle of modulating frequency R before the crystal 13F receives a pulse either from amplifier 20A or from amplifier 20B.

The modification shown in Fig. 8 is in many respects similar to that of Fig. 1 and consequently those elements of the two arrangements having corresponding functions are identified by the same reference characters. For brevity, only those elements or features differing from Fig. 1 are specifically discussed.

With the simpler arrangement shown in Fig. 8, there is avoided the circuit complications involved in switching of the sharply tuned IF amplifier 12, Fig. 1, from one control channel to the other. Instead of a sharply-tuned amplifier 12 switched from one control channel to the other, there are used, in the system of Fig. 8, two low pass filters 112A, 112B individual to the two control channels. These two filters need be only approximately similar and may, for example, be suited to pass a band of frequencies from 0 to 100 kilocycles.

The reasons it is not necessary in such system to use a common, switched filter in order to obtain precision will appear from the following discussion. As the intermediate frequency output of rectifier 13AC (or 13BD) approaches and passes through zero-beat, the amplitude response of the associated low-pass filter 112A (or 112B) varies symmetrically about the carrier frequency of FM oscillator 10C which corresponds with zero beat. The associated amplifier-differentiator 25A (or 25B) therefore produces an output pulse which occurs at the center or zero beat point of its input pulse regardless of any effect of temperature, for example, upon the band-width of the filter. In other respects, the operation of the systems of Fig. 1 is similar to that of Fig. 8 and it therefore appears unnecessary to repeat the description thereof. Though within the generic scope of the present invention, the modifications shown in Figs. 1 and 8 are per se claimed in copending application Serial No. 8,246, filed February 13, 1948.

In the systems shown in Figs. 1 and 8, the outputs of two stabilized microwave oscillators each having a rigidly controlled operating frequency of the order of tens of thousands of megacycles are mixed to produce a difference-frequency which is of the order of tens of megacycles. Thus, in what may be considered one frequency-dividing stage, the frequency is reduced by a factor of the order of thousands. In the system shown in Fig. 9, which also uses the molecular resonance frequency of a gas as a precise frequency standard to stabilize a microwave oscillator and by frequency-division produces a standard frequency low enough to drive a clock or indicator, the frequency is progressively divided to lower and lower precise frequencies by a succession of stages, each employing a search oscillator, a stabilized oscillator and a phase-comparator, until the frequency is low enough to permit further reduction by a conventional frequency-divider, such as a multivibrator.

For purpose of explanation, it will be assumed that the selected primary frequency standard is the 3,3 line of ammonia although it is to be understood that other lines of this or other suitable gas may be chosen. It will also be assumed that oscillator 100 of stage #1 is to be stabilized at a frequency of 4774 megacycles so that its fifth harmonic corresponds with a frequency of 23,870 megacycles at which the ammonia gas in cell 101 exhibits sharp molecular resonance. In such case, the search oscillator 102 is modulated as by a sawtooth generator to sweep over, for example, the frequency range of 23,860 to 23,880 megacycles. The search frequency and the fifth harmonic of oscillator 101 as produced by harmonic generator 103 are applied to mixer 104 to produce a varying beat-frequency which as amplified by amplifier 105 is applied to the phase-comparator 106. The search frequency is also impressed, through the gas cell 101, upon rectifier 107 to produce a series of pulses each occurring as the search frequency passes through the molecular resonance frequency of the gas. Generally as above described in discussion of Figs. 1 and 9, or as in my copending application Serial No. 4,497, filed January 27, 1948, the phase-comparator 106 produces an "error" voltage which is applied to oscillator 100 to correct for deviation of its operating frequency from the desired frequency here assumed to be 4774 megacycles.

For the moment digressing from description of Fig. 9, it is to be noted that in the systems of Figs. 1 and 8, the fundamental frequencies of the stabilized oscillators 10A and 10B may be mixed by the rectifier 13 and selected harmonics of those frequencies impressed upon the mixers 13AC and 13BD in accordance with the above discussion of stage #1 of Fig. 9. Thus, a much lower difference-frequency would be impressed on the frequency-divider 14 of Fig. 1 or 8.

Reverting to discussion of Fig. 9, the fundamental frequency of the stabilized oscillator 100 is impressed upon the mixer 108 of stage #2 upon which is also impressed the output of search oscillator 109 designed to sweep over a frequency range including the fundamental frequency of oscillator 100. In the specific example under discussion, the search range of oscillator 109 may be from 4770 to 4780 megacycles. The output of mixer 108 as amplified by amplifier 110 is transmitted to the phase comparator 111 to which is also transmitted, through amplifier 113, the output of mixer 114. The input frequencies to mixer 114 are the variable search frequency of oscillator 109 and a harmonic of the oscillator 115 to be stabilized. By way of example, the desired fundamental frequency of oscillator 115 may be 954.8 megacycles so that its fifth harmonic as produced by harmonic generator 116 corresponds with the fundamental frequency of the stabilized oscillator 100 of stage #1.

Any change in phase of the outputs of the amplifiers 110 and 113 is detected by the phase comparator 111 which, generally as previously described, produces a control voltage which as applied to oscillator 115 corrects for any deviation of its frequency from the desired value.

The fundamental output frequency of stage #2 is applied to stage #3 whose output frequency, by a similar arrangement of stabilized and search oscillators, mixers and phase-detector, is further reduced by a chosen factor. By way of example, the stabilized oscillator of stage #3 may have a fundamental frequency of 190.96 megacycles so that its fifth harmonic is equal to the fundamental frequency of oscillator 115 of stage #2.

By similar stages #4 and #5, the frequency is further reduced in steps so that the precisely controlled frequency applied to the multi-vibrator counter 14 or other suitable frequency divider is, for example, 7.638 megacycles assuming a dividing factor of 5 for each of stages #4 and 5.

It is to be understood that other selected harmonics of the stabilized oscillator may similarly be utilized: and that different harmonics may be chosen for different stages.

It is further to be understood that the beat-frequency to the amplifiers 105, 113 etc. of the successive stages are tuned may be of any desired value including zero and may be different for different stages.

The output frequency of divider 14 may itself be used as a standard low frequency of high precision or it may be used to drive a clock or indicator 15 having gearing suitable to afford the desired rotational speed, such as one revolution per second. The accuracy of such a "clock" is extremely high because the primary standard, the molecular resonant frequency of the selected gas line, is unaffected by temperature, pressure, time, friction or other variables some or all of which affect the accuracy of other previously known time standards.

From the foregoing explanation, it shall be understood the invention is not limited to the specific methods and systems specifically described and that changes and modifications may be made within the scope of the appended claims.

What is claimed is:

1. A system for producing a precise low frequency suited for indication of time which comprises at least two microwave oscillators, gas cell means containing gas exhibiting molecular resonance at microwave frequencies coupled to said oscillators for stabilizing said oscillators at different frequencies, and frequency-dividing means coupled to said oscillators whose input frequency bears a fixed numerical relation to said oscillator frequencies and whose output frequency is said precise low frequency.

2. A system for producing a precise low frequency which comprises a series of oscillators operating at different frequencies, means coupled to predetermined ones of said oscillators for regulating each oscillator so that a selected harmonic thereof equals the fundamental of the preceding oscillator, and means including a gas cell coupled to the first of said oscillators for regulating the first oscillator of the series so that its frequency bears a fixed relation to a frequency at which gas in said cell exhibits molecular resonance.

3. A standard frequency system which comprises a series of oscillator stages, each including a search oscillator, a regulated oscillator, and a phase comparator for regulating the regulated oscillator to maintain a predetermined phase relation between a timing wave and a reference wave, a gas cell in the first stage cooperating with the search oscillator of that stage to provide the reference wave for that stage, and a mixer in each of the succeeding stages cooperating with the search oscillator of that stage and the regulated oscillator of the preceding stage to provide the reference wave for the phase comparator of that stage.

4. A system as in claim 3 in which each of the stages includes a harmonic amplifier for the regulated oscillator so that a predetermined frequency relation is maintained between a selected harmonic of that oscillator and the fundamental frequency of the regulated amplifier of the preceding stage, the last of said stages having an output frequency related to the gas absorption frequency by a reducing factor equal to the product of the selected harmonics.

5. A system as in claim 3 in which the timing wave of each stage is derived by mixing the frequencies of the regulated and search oscillators of the stage and impressing the resulting varying beat frequency upon a frequency-selector.

6. The method of obtaining a precise low frequency for indication of time which comprises generating high frequency energy at two different frequencies, stabilizing said frequencies in response to molecular resonance of a microwave absorptive gas at microwave frequencies, producing in response to said stabilized frequencies a lower frequency precisely determined by at least one of said molecular resonance frequencies, and electronically dividing said lower frequency to produce a low frequency suitable for energization of an electric clock.

7. The method of producing alternating current having a precise frequency of the order of cycles per second which comprises generating first radio frequency energy, stabilizing the frequency of said energy in response to the selective absorption of a gas at a microwave frequency, generating radio frequency energy of a lower frequency than said first energy, stabilizing said lower frequency energy so that a selected harmonic thereof corresponds with the fundamental frequency of said first energy, repeating the two last-named steps to generate and stabilize energy of progressively lower frequencies to derive energy of a frequency which is of the order of kilocycles for the last of the series of said steps, and dividing said last frequency to produce a precise frequency of the order of cycles per second.

8. The method of obtaining a low frequency of high precision from a source of microwave frequency energy which comprises generating a series of progressively lower frequency signals, regulating the frequency of said series of signals so that a selected harmonic of each signal is equal to the fundamental frequency of the signal next higher in the series, and stabilizing the highest-frequency signal of the series in response to the selective microwave absorption of a gas so that the numerical relation of a molecular resonance frequency of the gas to the frequency of said highest-frequency signal energy is a small whole number.

9. The method which comprises performing in each of a series of progressively higher stages, the steps of producing oscillations of periodically varying frequency, producing oscillations of regulated fixed frequency, generating a timing wave, and maintaining a predetermined phase relation between said timing wave and a selected harmonic of said regulated oscillations; utilizing each of the higher stage oscillations as a timing wave for the next lower stage, producing the timing wave for the highest stage by impressing the variable frequency oscillations produced therein upon gas exhibiting molecular resonance at a frequency corresponding with said selected harmonic thereof, and indicating time in response to the lowest stage oscillations.

10. The method of utilizing a gas exhibiting molecular resonance at a microwave frequency to produce a precise frequency substantially lower than said microwave frequency which comprises in one step deriving oscillations of a frequency wherein a selected harmonic including the fundamental frequency thereof corresponds with said microwave frequency, and in each of one or more successive steps maintaining a predetermined frequency relationship between a selected harmonic of other oscillations and the frequency of the oscillations of the preceding step to derive in the final step oscillations having the desired precise lower frequency.

11. The method of utilizing a gas exhibiting molecular resonance at a microwave frequency to provide a precise indication of time which comprises in a first stage producing and regulating the frequency of microwave oscillations so that a selected harmonic thereof corresponds with said molecular resonant frequency of the gas, producing oscillations of lower frequency in successive stages maintaining a predetermined frequency relationship between a selected harmonic of said lower frequency oscillations and the fundamental frequency of the oscillations of the preceding stage, frequency dividing the oscillations deriving from the last of said stages, and indicating time in response to said frequency divided oscillations.

WILLIAM D. HERSHBERGER.

REFERENCES CITED

The following references are of record in the file of this patent:

UNITED STATES PATENTS

| Number | Name | Date |
| --- | --- | --- |
| 1,928,793 | Poole | Oct. 3, 1933 |
| 2,389,992 | Mayle | Nov. 27, 1945 |

OTHER REFERENCES

Radio News, Mar. 1949, Engineering dept., pages 14, 28 and 29.